July 22, 1958  G. SMITH  2,844,766

POSITIONING MOTOR

Filed Sept. 16, 1954  3 Sheets-Sheet 1

INVENTOR
Graydon Smith
BY
Curtis, Morris & Safford
ATTORNEYS

July 22, 1958 G. SMITH 2,844,766
POSITIONING MOTOR

Filed Sept. 16, 1954 3 Sheets-Sheet 2

INVENTOR
Graydon Smith
BY
Curtis, Morris & Safford
ATTORNEYS

July 22, 1958   G. SMITH   2,844,766
POSITIONING MOTOR

Filed Sept. 16, 1954   3 Sheets-Sheet 3

INVENTOR
Graydon Smith
BY
Curtis, Morris + Safford
ATTORNEYS

United States Patent Office 2,844,766
Patented July 22, 1958

2,844,766
POSITIONING MOTOR

Graydon Smith, Concord, Mass., assignor to The Foxboro Company, Foxboro, Mass., a corporation of Massachusetts Application September 16, 1954, Serial No. 456,537

11 Claims. (Cl. 317—172)

This invention relates to electrically operated positioning motors and particularly to such as used in self-balancing measuring systems, for example, of the kind shown in U. S. Patent 2,630,007.

An object of this invention is to provide a motor capable of mechanically positioning a movable element very rapidly and with extreme accuracy.

Another object is to provide such a motor which is of simple construction.

In self-balancing systems of the type shown in the above-identified patent, the change in a physical condition, such as the load stress in a member, is measured by detecting for example, the variation in resistance of a sensing element. This variation in resistance can be detected and recorded by an alternating current impedance bridge which is continuously balanced by, for example, a variable capacitor. An output signal from the bridge, which occurs upon unbalance thereof, is amplified and put in suitable form to drive a positioning motor which is in turn mechanically connected back directly to the bridge balancing capacitor in such a way that the bridge is automatically maintained in balance. The position of the motor, being dependent upon the balance position of the capacitor, thus provides an exact measure of the physical condition in interest.

One important difficulty encountered in measuring with systems of this type has been the sluggishness, so to speak, of the positioning motors heretofore known. If the output drive of the motor is braked by friction or by the load placed upon it, or if there is mechanical backlash in the motor drive, then the motor will be unable to balance the bridge exactly.

It is, of course, possible to overcome to some extent the effect of loading or friction upon the motor and to overcome mechanical backlash by coupling a relatively powerful motor directly to the positioning element. Unfortunately a powerful motor is also large and bulky and, more importantly, has much greater inertia than a small less powerful motor. Thus, in avoiding one kind of difficulty another perhaps more troublesome arises since, if a motor has appreciable inertia, it will not respond quickly enough to rapidly varying input signals. Moreover, a motor with much inertia will overshoot the position to which it is being driven and thus tend to oscillate or hunt. In the particular balanceable bridge disclosed in the above patent wherein a variable capacitor is used to balance the bridge, since this capacitor needs to be driven through only a small angular rotation, e. g. of about 30°, and accordingly must be positioned precisely, the positioning motor must respond accurately and quickly. Hence, a motor possibly of satisfactory quality in other systems is not satisfactory in this one. The present invention therefore seeks to provide as one of its specific objects a simple motor having the inherent quality and high precision needed for accuracy in such a capacity-balanced system.

In accordance with the present invention, in one specific embodiment thereof, advantage is taken of the fact that the motor is only required to rotate through a moderate angle, and not continuously in the same direction. This permits arranging the elements of an electric motor in a new and novel manner to provide in combination high torque, low inertia and low friction to a degree not possible in conventional motors. This is accomplished, as compared to a direct current motor of usual design, by disposing the armature winding upon a stationary part of the magnetic structure and by eliminating the commutator. Thus the inertia of the rotor may be kept low since the weight of the windings, insulation and commutator are removed from it. Furthermore, friction may be made low since the drag of brushes is eliminated and magnetic forces are so well balanced that light instrument-type bearings can be used. An additional virtue of the arrangement is that no complicated parts are needed and those that are used are easy to assemble and do not require especially close tolerances.

An understanding of the general nature of the invention and an appreciation of its many advantages will best be gained from a study of the following description given in connection with the drawings in which.

Figure 1:
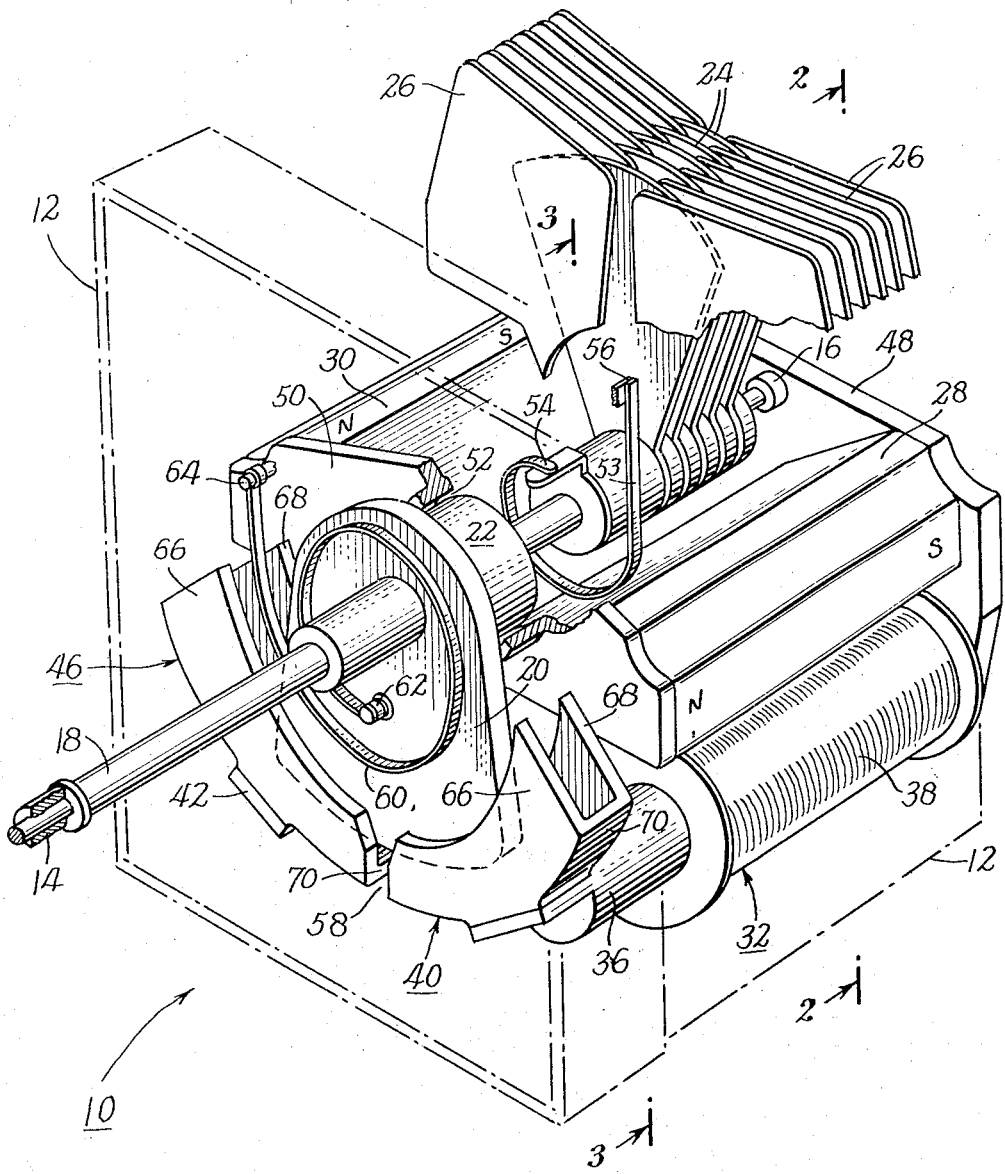
Figure 1 is a perspective view with parts broken away of an embodiment of the invention given by way of illustration.

Figure 1 shows a positioning motor 10 constructed in accordance with the present invention. Motor 10 includes a frame 12, not shown in detail for the sake of simplifying the drawing but shown in dotted outline, which may have any convenient shape and which may be made of any suitable non-magnetic material, such as aluminum. Supported on frame 12 by means of two fixed bearings 14 and 16 is a freely rotable rotor 18 upon which is carried a rotor arm 20. Arm 20 is rigidly fixed to the rotor by means of a hub 22 (see Figure 3) which is integral with the arm. Referring to the upper part of Figure 2, a number of spaced plates 24 which comprise the moving parts of a variable air capacitor 26 supported on frame 12, are rigidly fixed on the opposite side of rotor 18 relative to arm 20.

Since the rotation of plates 24 does not cause mechanical braking of rotor 18 and since these plates are directly coupled to the rotor, they can be positioned with a minimum of motor driving power and with no backlash. Moreover, since these plates have been positioned on the side of the rotor opposite to arm 20 (see Figure 2 where, although arm 20 is not seen in this cross-section view, it has been shown in dotted outline to indicate its relation to plates 24), the rotor is statically balanced and will not tend to rotate of itself. Capacitor 26 can be used directly to balance a bridge in the way taught in the above-mentioned patent.

Fixed to frame 12 are permanent magnets 28 and 30 poled in the same direction and respectively positioned on each side of rotor 18. As shown in Figure 1, these magnets have their north poles adjacent arm 20, though they could have their south poles here instead. Each magnet is equally spaced approximately parallel to the rotor and on roughly the same level as the rotor and other magnet. The spacing between these magnets is made large enough so that plates 24 can be rotated over an angle of roughly 45°. Positioned directly underneath each magnet are armature structures 32 and 34 which are adapted to be energized by a variable direct current signal which acts to move rotor 18 to a desired position as will be explained presently.

Armature structure 32 consists of a core 36, one or more solenoid windings 38 surrounding the core and (see Figures 1 and 4) a pole piece 40 affixed to the end of the core. Similarly, armature structure 34 consists of a core 42, one or more windings 44 and a pole piece 46. The two cores 36 and 42 are arranged parallel to magnets 28 and 30 and are spaced relative to rotor 18 so that pole pieces 40 and 46 are symmetrically positioned with respect to the locus of rotation of arm 20.

Figure 2:
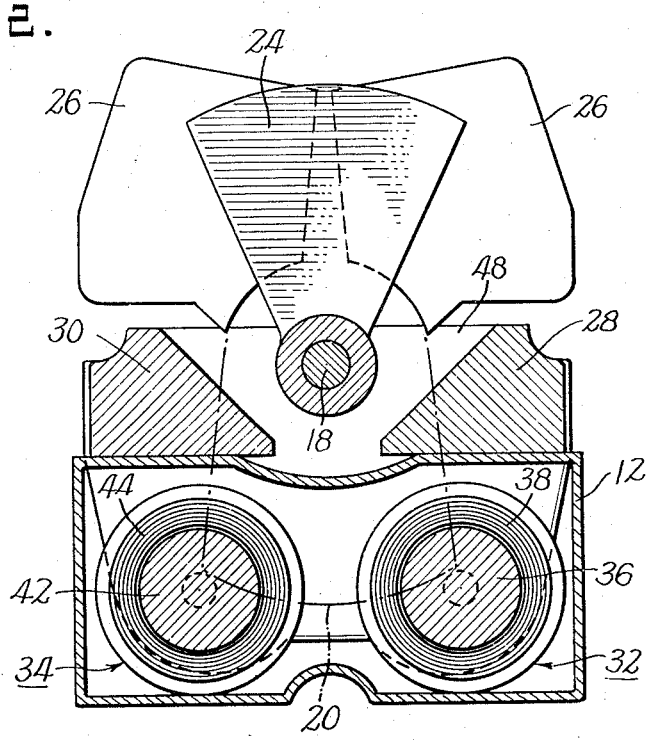
Figure 2 is a partial cross-section view of the embodiment of Figure 1 taken as indicated therein by line 2—2.

As shown in Figure 2, a magnetic flux path between the rear ends of cores 36 and 42 and magnets 28 and 30 is supplied by vertical plate 48, which is fixed to frame 12 and to which each of the cores and magnets is attached. This plate also carries the rear bearing which supports that end of rotor 18, this rear bearing being shown in Figure 1 at 16.

Figure 3:
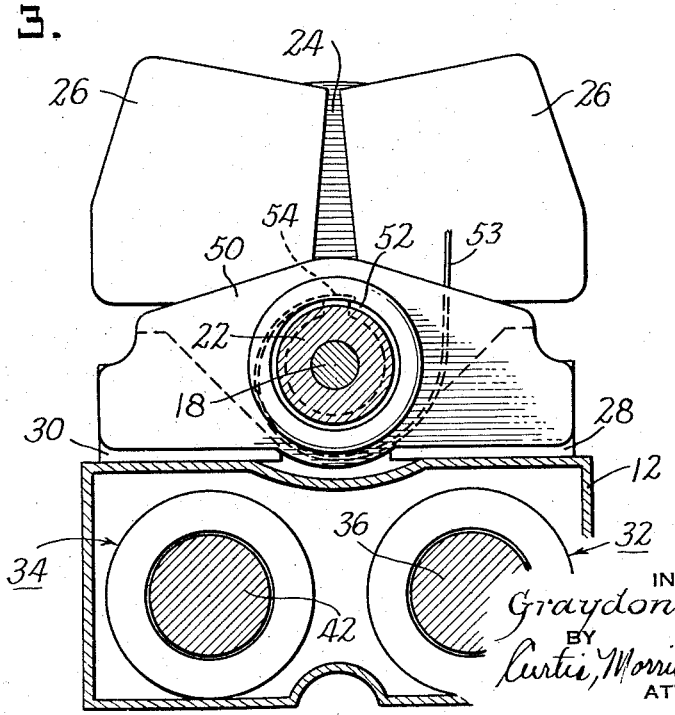
Figure 3 is a partial cross-section view of the embodiment of Figure 1 taken as indicated therein by line 3—3.

As shown in Figure 3, a magnetic path between the front ends of magnets 28 and 30 is provided by yoke 50, which, for convenience is also supported by frame 12 along with these magnets. Centered within a circular opening in yoke 50 is hub 22, which is an integral part of arm 20, is fixed to rotor 18, and is free to rotate. Air gap 52 between hub and yoke should be made as small and as uniform as is conveniently possible since the magnetic lines of flux from magnets 28 and 30 must cross this gap to reach the hub and thus to flow through arm 20. Fixed to rotor 18 at point 54 and to frame 12 at point 56, a loosely signaled conductor 53 gives a positive ground connection between the rotor and the frame.

Figure 4:
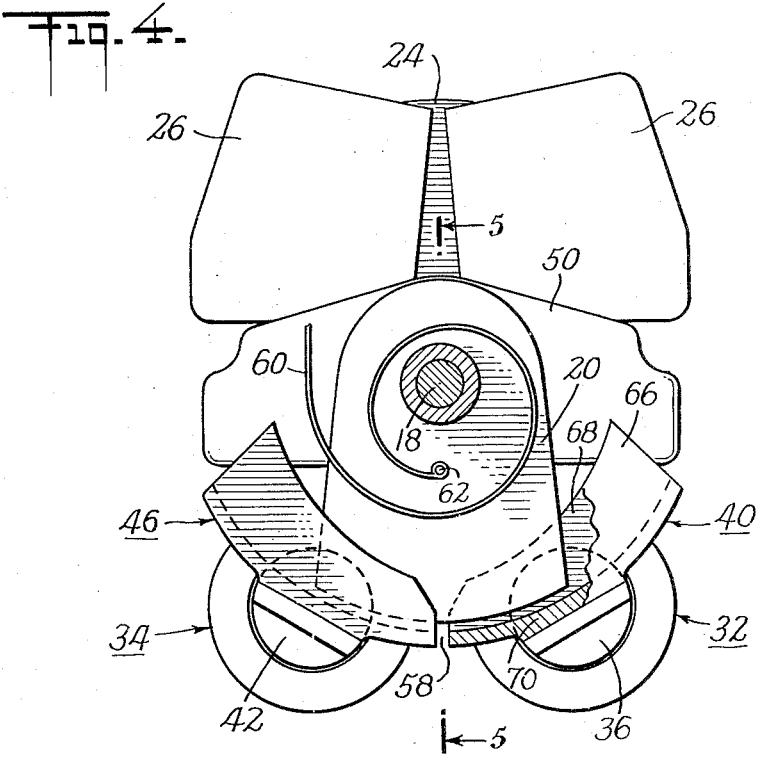
Figure 4 is a partial front view of the embodiment of Figure 1.

As can be seen from the front view of motor 10 shown in Figure 4, pole pieces 40 and 46 which are connected to cores 36 and 42 respectively, are each shaped approximately as a segment of an annulus whose center coincides with the axis of rotor 18. These pole pieces are separated at their adjacent ends by a moderate length air gap 58. To compensate for magnetic field fringing they are made slightly wider at their opposite ends than at their adjacent ends and to this extent are not exactly shaped as segments of the annulus specified. Connected to rotor 18 at point 62 and to frame 12 at point 64, conductor 60, similar to conductor 53, provides a positive ground connection for the rotor assembly.

Figure 5:
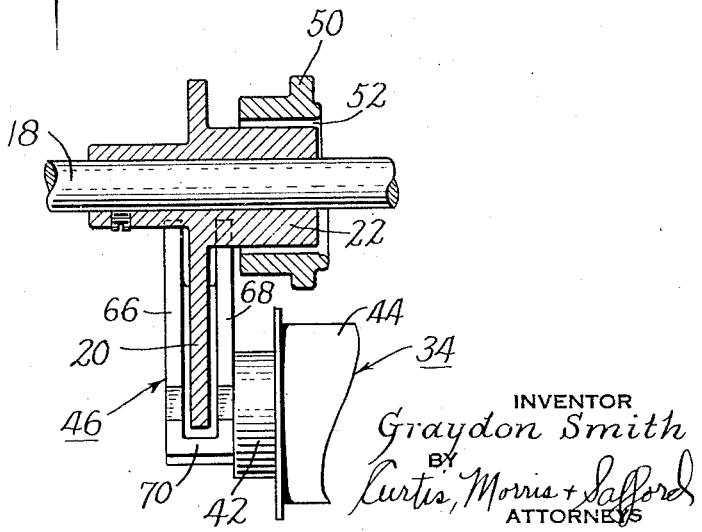
Figure 5 is an end view of one of the pole pieces shown in Figure 4 taken as indicated by line 5—5 therein.

It can be seen in Figures 4 and 5 that each pole piece has a front surface 66 and a rear surface 68 spaced parallel to each other by a connecting web 70. Thus there is provided down the length of each pole piece a channel through which arm 20 can be rotated. A virtue of this is that arm 20 is approximately equally attracted longitudinally to faces 66 and to faces 68 so that the net longitudinal force upon it is minimized. Therefore, the bearings which support rotor 18 need be able to accommodate only a small axial thrust force.

Cores 36 and 42, pole pieces 40 and 46, arm 20 and hub 22, yoke 50 and vertical plate 48 are made of any good magnetic material, such as soft iron, and they, together with magnets 28 and 30, comprise the magnetic circuit of motor 10. Each of these should be made large enough to prevent magnetic flux saturation. Magnets 28 and 30 may be made from any good permanent magnetic material, such as Alnico V or Alnico VI. The other parts of the motor should be non-magnetic in order not to disturb this circuit.

The operation of this invention will be better understood if its parts are identified with the similar parts of the conventional direct current motor. A steady magnetic flux, corresponding to the "field" of the D. C. motor is supplied by permanent magnets 28 and 30. This flux flows from magnets 28 and 30, through end plate 48 to the cores 36 and 42 and the pole pieces 40 and 46 of the armature structure, across the air gap to arm 20, through the hub 22 across air gap 52 to yoke 50 and thence to the permanent magnets 28 and 30. Since the reluctance of this magnetic circuit is invariable with respect to rotor position, like a conventional D. C. motor, there is no magnetic pull upon the rotor in the absence of an electric current. The rotor will rest anywhere it may happen to be unless energized to move elsewhere, as in the case of a conventional D. C. motor.

The division of flux between the cores 36 and 42 of the armature structure depends on the position of the arm 20. Thus, if arm 20 moves from a position within pole piece 40 to a position within pole piece 46, the flux will decrease in core 36 and increase in core 42. This change in flux will induce a voltage in windings upon cores 36 and 42 in a manner strictly analogous to the back electromotive force in a conventional direct current motor, and this voltage may limit the speed of rotation as in a conventional direct current motor.

If windings 38 and 44 are connected in series so that induced voltages add and a current is passed through said windings, it will be found that torque is proportional to current, that the torque reverses when current reverses, that the torque is constant for all rotor positions, and that maximum rotational speed is limited by the applied voltage less the IR drop in the winding. It should be noted that these characteristics are strictly those of a conventional direct current motor and have no similarity to electromagnetic devices such as solenoids, electromagnets, moving-iron loudspeakers or other such structures which this invention may superficially resemble.

As in the case of the conventional direct-current motor, the armature winding may be divided to provide for differential response to two energizing currents. However, this is very awkward and expensive in a conventional motor as a separate commutator for each winding is required, but in this invention is readily accomplished. Complex multiple windings are practical and may be used for some purposes, but in general a simple center-tapped winding is most useful as it provides for convenient reversible operation from a pair of vacuum tubes.

Although not specifically set forth herein, the means for energizing each of electromagnets 32 and 34 can be any convenient arrangement well known to the art or it can be that shown specifically in the above patent.

The description herein is intended in illustration and not in limitation. Various changes or modifications in the embodiment described may occur to those skilled in the art and these changes or modifications can be made without departing from the spirit or scope of the invention as set forth.

I claim:

1. A positioning motor comprising: a frame; a rotatable member supported by said frame on at least one bearing defining an axis of rotation; a fan-shaped arm of magnetic material fixed to said member with the major surface of said arm perpendicular to the axis of rotation of said member; a pair of curved pole pieces symmetrically positioned relative to said arm across two air gaps and relative to each other across one air gap, each pole piece having a front and rear surface parallel to each other and between which said arm is centered and free to move farther into one pole piece and out of the other and vice versa so that the force exerted on said arm by said pole pieces is primarily rotational; and means including two electromagnets and said pole pieces for generating in accordance with an input signal a magnetic field around each of said pole pieces, said fields being shaped so that when of substantially equal intensity said arm can dwell in any position within its range of rotation and when said fields are unequal in intensity said arm is rotated about said axis of rotation with a substantially uniform force.

2. A unitary positioning motor and bridge balancing capacitor comprising: a frame; a rotor shaft supported by said frame on bearings defining an axis of rotation; an arm of magnetic material fixed to said shaft and movable along an arcuate path subtending an acute angle; at least one plate of a variable air capacitor fixed to said shaft and positioned to counter-balance the weight of said arm; a pair of channeled pole pieces symmetrically positioned relative to said shaft and to each other, spaced apart across an air gap and curved along said arcuate path whereby said arm is free to move within said pole pieces; means including said pole pieces and an electromagnet adjacent each pole piece for establishing a like shaped magnetic field around each pole piece, each field having a uniform portion, said fields positioned so that said arm moves within said uniform portions, the movement of said arm being limited so that it does not move out of said uniform portions whereby when said fields are of equal intensity said arm is free to rest in any position within its range of movement and when said fields are unequal said arm is rotated around said axis of rotation.

3. A reversible positioning motor comprising: a rotatable member supported on a frame by at least one bearing defining an axis of rotation, said member including as an integral part thereof an arm of magnetic material rotatable about said axis of rotation back and forth along a limited arcuate path; means including two solenoid windings adapted to be energized by signal currents and having a pole piece of magnetic material adjacent each winding for establishing two like magnetic fields positioned along said arcuate path, said pole pieces extending substantially continuously along said path and being separated from each other by a narrow air gap, said fields being shaped so that when of equal intensity they attract said arm with equal and opposite forces regardless of the position of said arm within its limits of rotation, but when of unequal intensity they rotate said arm in a desired direction; and at least one permanent magnet inserted in the magnetic flux path between said arm and said pole pieces.

4. The combination of elements as in claim 3 in which said pole pieces are approximately cylindrically curved along said arcuate path, are separated from each other by a small air gap and together extend over a length greater than said arcuate path so that the net rotational force exerted on said arm when said fields are unequal by a given amount is substantially uniform at any position of said arm within its limits of rotation.

5. The combination of elements as in claim 4 in which said pole pieces are channeled along said arcuate path and said arm is roughly fan shaped with its major surface perpendicular to said axis of rotation, said arm extends into said pole pieces and is adapted to move along said channel.

6. A positioning motor comprising a counter-balanced rotatable shaft supported on a frame by at least one bearing defining an axis of rotation; an arm of magnetic material fixed to said shaft and adapted to rotate about said axis of rotation over an arcuate path subtending an acute angle; a pair of channeled pole pieces separated from each other by an air gap of relatively short length and curved along said arcuate path so that said arm extends within said pole pieces and can move along the channel in each; two cores of magnetic material, one attached to each of said pole pieces and symmetrically positioned parallel with respect to said axis of rotation and to each other; two solenoid windings, one surrounding each of said cores and adapted to induce therein in accordance with an energizing signal lines of magnetic flux; two magnets poled in the same direction and supported on the motor frame; and means including magnetic material for completing the magnetic circuit between said magnets and said arm and between said magnets and said cores.

7. The combination of elements as in claim 6 in further combination with the movable plates of a fixed condenser attached to said shaft and with equally and oppositely spiraled grounding conductors connected between said shaft and the motor frame.

8. A high efficiency positioning motor comprising: an armature of magnetic material movable back and forth along a limited path of travel, two pole pieces of magnetic material together extending substantially all the way along the length of said path and positioned closely adjacent to said armature, said pole pieces being separated from each other by a narrow central air gap lying substantially midway between the ends of said path of travel, magnetic means for completing a substantially closed magnetic circuit from said pole pieces across a narrow air gap to said armature and thence through said armature back to said pole pieces, at least one large powerful permanent magnet in said magnetic circuit, and at least one electric current winding encircling said magnetic circuit for superimposing on the permanent magnet flux an incremental flux in one direction or the other to move said armature to any desired position along said path, whereby when said incremental flux is zero, said armature can dwell in any desired position.

9. The structure as in claim 8 wherein said armature is rotatably mounted on a lightweight axle along with an element for controlling the current through said winding, said armature being fan-shaped and having a relatively large hub around said axle, said magnetic means including a stationary member of magnetic material annularly surrounding said hub across a narrow air gap of substantial radius whereby the reluctance of said magnetic circuit is minimized and the sidewise pull on said axle is balanced.

10. The structure as in claim 9 wherein each of said pole pieces is an arcuate channel-shaped member, said armature being mounted to move within each of said pole pieces whereby the sidewise magnetic pull on said armature at its outer end is balanced.

11. The structure as in claim 9 wherein each of said pole pieces increases in area outward from said central air gap toward the ends of said path to compensate for flux leakage.

References Cited in the file of this patent

UNITED STATES PATENTS

| 843,287 | MacCoy | Feb. 5, 1907 |
| 1,301,050 | Hagman | Apr. 15, 1919 |
| 1,519,675 | Ford | Dec. 16, 1924 |
| 1,787,620 | Favarger | Jan. 6, 1931 |
| 2,735,045 | Savoie | Feb. 14, 1956 |

FOREIGN PATENTS

| 515,515 | Great Britain | Dec. 7, 1939 |